US010198194B2

(12) United States Patent
Colgrove et al.

(10) Patent No.: US 10,198,194 B2
(45) Date of Patent: Feb. 5, 2019

(54) PLACING DATA WITHIN A STORAGE DEVICE OF A FLASH ARRAY

(71) Applicant: Pure Storage, Inc., Mountain View, CA (US)

(72) Inventors: John Colgrove, Los Altos, CA (US); Ethan Miller, Santa Cruz, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

(21) Appl. No.: 14/834,376

(22) Filed: Aug. 24, 2015

(65) Prior Publication Data

US 2017/0060444 A1     Mar. 2, 2017

(51) Int. Cl.
*G06F 3/06* (2006.01)
*G06F 12/02* (2006.01)

(52) U.S. Cl.
CPC .......... *G06F 3/0616* (2013.01); *G06F 3/0641* (2013.01); *G06F 3/0649* (2013.01); *G06F 3/0652* (2013.01); *G06F 3/0673* (2013.01); *G06F 12/0238* (2013.01); *G06F 12/0276* (2013.01); *G06F 2212/1016* (2013.01); *G06F 2212/1044* (2013.01); *G06F 2212/7202* (2013.01); *G06F 2212/7205* (2013.01); *G06F 2212/7208* (2013.01); *G06F 2212/7211* (2013.01)

(58) Field of Classification Search
CPC .... G06F 3/0616; G06F 3/0641; G06F 3/0649; G06F 3/0652; G06F 3/0673
See application file for complete search history.

(56) References Cited

U.S. PATENT DOCUMENTS

| 5,706,210 A | 1/1998 | Kumano et al. |
|---|---|---|
| 5,799,200 A | 8/1998 | Brant et al. |
| 5,933,598 A | 8/1999 | Scales et al. |
| 6,012,032 A | 1/2000 | Donovan et al. |
| 6,085,333 A | 7/2000 | DeKoning et al. |
| 6,643,641 B1 | 11/2003 | Snyder |
| 6,647,514 B1 | 11/2003 | Umberger et al. |

(Continued)

FOREIGN PATENT DOCUMENTS

| EP | 0725324 A2 | 8/1996 |
|---|---|---|
| WO | WO-2012/087648 A1 | 6/2012 |

(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

(Continued)

*Primary Examiner* — Ramon A. Mercado
(74) *Attorney, Agent, or Firm* — Edward J. Lenart; Kennedy Lenart Spraggins LLP (57) ABSTRACT

Placing data within a storage device, including: receiving, by a storage device, information describing an expected longevity of data stored on the storage device; determining, by the storage device, a location for storing the data in dependence upon the expected longevity of the data; adjusting a garbage collection schedule in dependence upon data placement; and providing, to a storage array controller, garbage collection statistics.

3 Claims, 5 Drawing Sheets

(56) References Cited

U.S. PATENT DOCUMENTS

| | | |
|---|---|---|
| 6,789,162 B1 | 9/2004 | Talagala et al. |
| 7,089,272 B1 * | 8/2006 | Garthwaite ......... G06F 12/0276 |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,271,700 B1 | 9/2012 | Annem et al. |
| 8,387,136 B2 | 2/2013 | Lee et al. |
| 8,437,189 B1 * | 5/2013 | Montierth ............... G11C 16/10 |
| | | 365/185.09 |
| 8,463,825 B1 * | 6/2013 | Harty ................. G06F 17/30233 |
| | | 707/813 |
| 8,465,332 B2 | 6/2013 | Hogan et al. |
| 8,527,544 B1 * | 9/2013 | Colgrove ............... G06F 3/0608 |
| | | 707/791 |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,751,463 B1 | 6/2014 | Chamness |
| 8,762,642 B2 | 6/2014 | Bates et al. |
| 8,769,622 B2 | 7/2014 | Chang et al. |
| 8,788,778 B1 * | 7/2014 | Boyle ................. G06F 12/0253 |
| | | 711/155 |
| 8,800,009 B1 | 8/2014 | Beda, III et al. |
| 8,812,860 B1 | 8/2014 | Bray |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,124,569 B2 | 9/2015 | Hussain et al. |
| 9,134,922 B2 | 9/2015 | Rajagopal et al. |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,444,822 B1 | 9/2016 | Borowiec et al. |
| 9,448,928 B2 * | 9/2016 | Ahad .................. G06F 12/0253 |
| 9,507,532 B1 | 11/2016 | Colgrove et al. |
| 2002/0013802 A1 | 1/2002 | Mori et al. |
| 2003/0145172 A1 | 7/2003 | Galbraith et al. |
| 2003/0191783 A1 * | 10/2003 | Wolczko ............... G06F 12/0261 |
| 2003/0225961 A1 | 12/2003 | Chow et al. |
| 2004/0080985 A1 | 4/2004 | Chang et al. |
| 2004/0111573 A1 * | 6/2004 | Garthwaite ......... G06F 12/0276 |
| | | 711/159 |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 * | 7/2005 | Jamison ............... G06F 12/0253 |
| | | 717/154 |
| 2005/0188246 A1 | 8/2005 | Emberty et al. |
| 2005/0216800 A1 | 9/2005 | Bicknell et al. |
| 2006/0015771 A1 | 1/2006 | Vana Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2012/0023144 A1 * | 1/2012 | Rub .................... G06F 12/0246 |
| | | 707/813 |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 * | 8/2013 | Joshi ................... G06F 12/084 |
| | | 711/130 |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0297884 A1 * | 11/2013 | Hyde, II ............. G06F 12/0891 |
| | | 711/135 |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 * | 8/2014 | Goss .................. G06F 12/0246 |
| | | 711/103 |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0324924 A1 * | 10/2014 | Ahad .................. G06F 12/0253 |
| | | 707/813 |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |

(56) References Cited

U.S. PATENT DOCUMENTS

| | | | |
|---|---|---|---|
| 2015/0149822 A1 | 5/2015 | Coronado et al. | |
| 2015/0179254 A1* | 6/2015 | Alrod | G11C 13/0033 365/148 |
| 2015/0193169 A1 | 7/2015 | Sundaram et al. | |
| 2015/0378888 A1 | 12/2015 | Zhang et al. | |
| 2016/0098323 A1 | 4/2016 | Mutha et al. | |
| 2016/0350009 A1 | 12/2016 | Cerreta et al. | |
| 2016/0352720 A1 | 12/2016 | Hu et al. | |
| 2016/0352830 A1 | 12/2016 | Borowiec et al. | |
| 2016/0352834 A1 | 12/2016 | Borowiec et al. | |
| 2017/0060444 A1* | 3/2017 | Colgrove | G06F 3/0616 |

FOREIGN PATENT DOCUMENTS

| | | |
|---|---|---|
| WO | WO2013071087 A1 | 5/2013 |
| WO | WO-2014/110137 A1 | 7/2014 |
| WO | WO-2016/015008 A1 | 12/2016 |
| WO | WO-2016/190938 A1 | 12/2016 |
| WO | WO-2016/195759 A1 | 12/2016 |
| WO | WO-2016/195958 A1 | 12/2016 |
| WO | WO-2016/195961 A1 | 12/2016 |

OTHER PUBLICATIONS

PCMag. "Storage Array Definition". Published May 10, 2013. <http://web.archive.org/web/20130510121646/http://www.pcmag.com/encyclopedia/term/52091/storage-array>, 2 pages.

Google Search of "storage array define" performed by the Examiner on Nov. 4, 2015 for U.S. Appl. No. 14/725,278, Results limited to entries dated before 2012, 1 page.

Techopedia. "What is a disk array". Published Jan. 13, 2012. <http://web.archive.org/web/20120113053358/http://www.techopedia.com/definition/1009/disk-array>, 1 page.

Webopedia. "What is a disk array". Published May 26, 2011. <http://web.archive.org/web/20110526081214/http://www,webopedia.com/TERM/D/disk_array.html>, 2 pages.

Li et al., *Access Control for the Services Oriented Architecture*, Proceedings of the 2007 ACM Workshop on Secure Web Services (SWS '07), Nov. 2007, pp. 9-17, ACM New York, NY.

The International Serach Report and the Written Opinoin received from the International Searching Authority (ISA/EPO) for International Application No. PCT/US2016/015006, dated Apr. 29, 2016, 12 pages.

The International Serach Report and the Written Opinoin received from the International Searching Authority (ISA/EPO) for International Application No. PCT/US2016/015008, dated May 4, 2016, 12 pages.

C. Hota et al., *Capability-based Cryptographic Data Access Controlin Cloud Computing*, Int. J. Advanced Networking and Applications, col. 1, Issue 1, dated Aug. 2011, 10 pages.

The International Search Report and the Written Opinion received from the International Searching Authority (ISA/EPO) for International Application No. PCT/US2016/020410, dated Jul. 8, 2016, 17 pages.

The International Search Report and the Written Opinion received from the International Searching Authority (ISA/EPO) for International Application No. PCT/US2016/032084, dated Jul. 18, 2016, 12 pages.

Faith, "dictzip file format", GitHub.com (online). [accessed Jul. 28, 2015], 1 page, URL: https://github.com/fidlej/idzip.

Wikipedia, "Convergent Encryption", Wikipedia.org (online), accessed Sep. 8, 2015, 2 pages, URL: en.wikipedia.org/wiki/Convergent_encryption.

Storer et al., "Secure Data Deduplication", Proceedings of the 4th ACM International Workshop on Storage Security and Survivability (StorageSS'08), Oct. 2008, 10 pages, ACM New York, NY. USA. DOI: 10.1145/1456469.1456471.

The International Serach Report and the Written Opinoin received from the International Searching Authority (ISA/EPO) for International Application No. PCT/US2016/016333, dated Jun. 8, 2016, 12 pages.

ETSI, *Network Function Virtualisation (NFV); Resiliency Requirements*, ETSI GS NFCV-REL 001, V1.1.1, http://www.etsi.org/deliver/etsi_gs/NFV-REL/001_099/001/01.01.01_60/gs_NFV-REL001v010101p.pdf (online), dated Jan. 2015, 82 pages.

The International Search Report and the Written Opinoin received from the International Searching Authority (ISA/EPO) for International Application No. PCT/US2016/032052, dated Aug. 30, 2016, 17 pages.

Microsoft, "Hybrid for SharePoint Server 2013—Security Reference Architecture", <http://hybrid.office.com/img/Security_Reference Architecture.pdf> (online), dated Oct. 2014, 53 pages.

Microsoft, "Hybrid Identity", <http://aka.ms/HybridIdentityWp> (online), dated Apr. 2014, 36 pages.

Microsoft, "Hybrid Identity Management", <http://download.microsoft.com/download/E/A/E/EAE57CD1-A80B-423C-96BB-142FAAC630B9/Hybrid_Identity_Datasheet.pdf> (online), published Apr. 2014, 17 pages.

Jacob Bellamy-McIntyre et al., "OpenID and the EnterpriseL a Model-based Analysis of Single Sign-On Authentication", 2011 15th IEEE International Enterprise Distributed Object Computing Conference (EDOC), DOI: 10.1109/EDOC.2011.26, ISBN: 978-1-4577-0362-1, <https://www.cs.auckland.ac.nz/~lutteroth/publications/McIntyreLutterothWeber2011-OpenID.pdf> (online), dated Aug. 29, 2011, 10 pages.

The International Search Report and the Written Opinoin received from the International Searching Authority (ISA/EPO) for International Application No. PCT/US2016/035492, dated Aug. 17, 2016, 10 pages.

Kong, *Using PCI Express As the Primary System Interconnect in Multiroot Compute, Storage, Communications and Embedded Systems*, White Paper, IDT.com (online), Aug. 28, 2008, 12 pages, URL: www.idt.com/document/whp/idt-pcie-multi-root-white-paper.

Hu et al., *Container Marking: Combining Data Placement, Garbage Collection and Wear Levelling for Flash*, 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

International Search Report and Written Opinion, PCT/US2016/044876, dated Oct. 21, 2016, 12 pages.

International Search Report and Written Opinion, PCT/US2016/044877, dated Sep. 29, 2016, 13 pages.

* cited by examiner

PLACING DATA WITHIN A STORAGE DEVICE OF A FLASH ARRAY

BACKGROUND

Field of Technology

The field of technology is data processing, or, more specifically, methods, apparatuses, and products for placing data within a storage device.

Description of Related Art

Storage systems often utilize a large number of storage devices for storing data. Each storage device in the storage system performs garbage collection without taking into account all available information. This results in inefficient garbage collection and inefficient co-location of migrated valid data to other erase blocks within the storage device. As a result, invalid pages may be evenly distributed throughout the erase blocks as time goes by, which would make it harder to find good erase blocks to erase, and increasing write amplification when an erase block is erased.

SUMMARY

Methods, apparatus, and products for placing data within a storage device, including: receiving, by a storage device, information describing an expected longevity of data to be stored on the storage device; and determining, by the storage device, a location for storing the data in dependence upon the expected longevity of the data.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
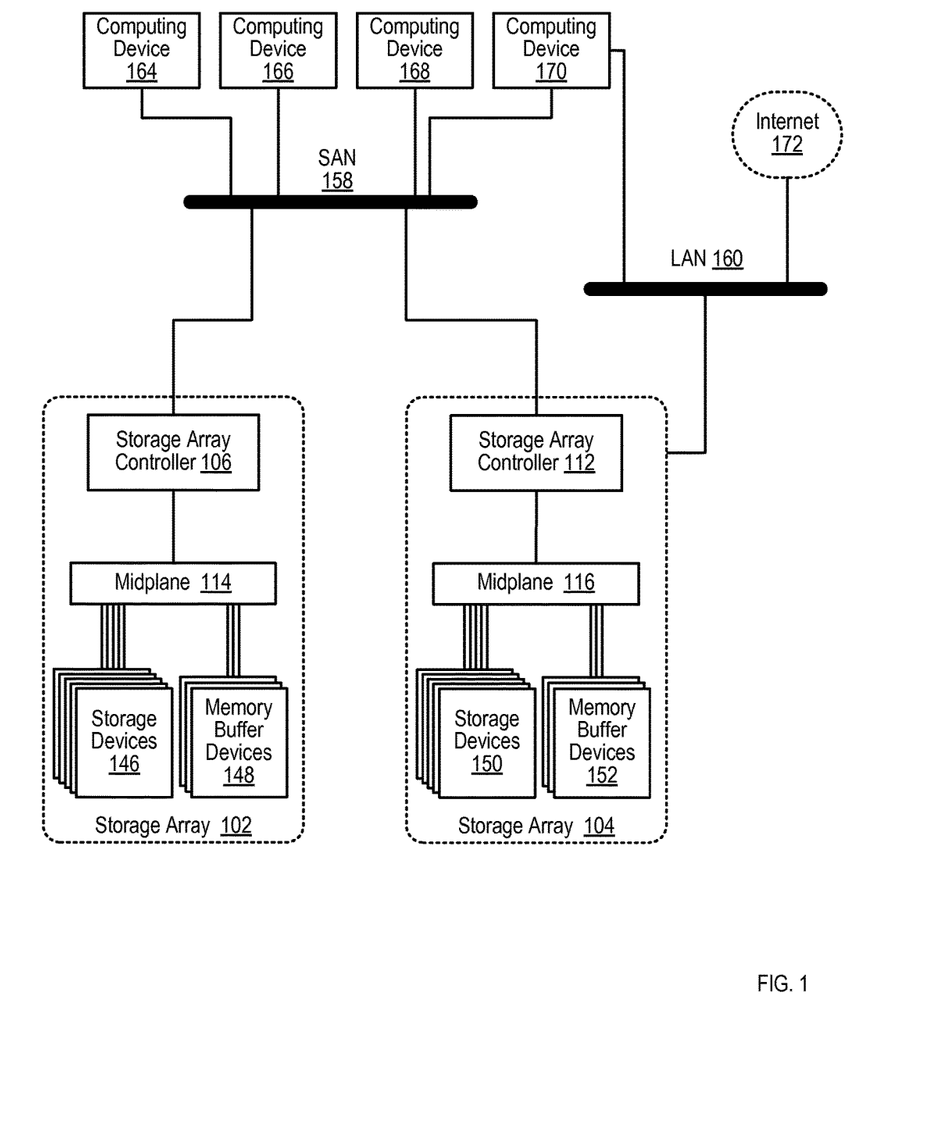
FIG. 1 sets forth a block diagram of an example system configured for placing data within a storage device according to embodiments of the present disclosure.

Example methods, apparatuses, and products for placing data within a storage device in accordance with the present disclosure are described with reference to the accompanying drawings, beginning with FIG. 1. FIG. 1 sets forth a block diagram of a system configured for placing data within a storage device according to embodiments of the present disclosure. The system of FIG. 1 includes a number of computing devices (164, 166, 168, 170). Such computing devices may be implemented in a number of different ways. For example, a computing device may be a server in a data center, a workstation, a personal computer, a notebook, or the like.

The computing devices (164, 166, 168, 170) in the example of FIG. 1 are coupled for data communications to a number of storage arrays (102, 104) through a storage area network ('SAN') (158) as well as a local area network (160) ('LAN'). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol (SIP), Real Time Protocol ('RTP') and others as will occur to those of skill in the art.

The example storage arrays (102, 104) of FIG. 1 provide persistent data storage for the computing devices (164, 166, 168, 170). Each storage array (102, 104) depicted in FIG. 1 includes a storage array controller (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114), to a number of storage devices (146, 150), and a number of write buffer devices (148, 152).

Each write buffer device (148, 152) may be configured to receive, from the storage array controller (106, 112), data to be stored in the storage devices (146). Such data may originate from any one of the computing devices (164, 166, 168, 170). In the example of FIG. 1, writing data to the write buffer device (148, 152) may be carried out more quickly than writing data to the storage device (146, 150). The storage array controller (106, 112) may be configured to effectively utilize the write buffer devices (148, 152) as a quickly accessible buffer for data destined to be written to storage. In this way, the latency of write requests may be significantly improved relative to a system in which the storage array controller writes data directly to the storage devices (146, 150).

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives (e.g., "Flash drives"), and the like.

The example storage devices (146, 150) depicted in FIG. 1 may be configured for placing data within the storage devices (146, 150) by receiving information describing an expected longevity of data stored on the storage device and determining a location for storing the data in dependence upon the expected longevity of the data, as will be described in greater detail below. The storage devices (146, 150) depicted in FIG. 1 may be further configured for placing data within the storage devices (146, 150) by performing other steps such as, for example, adjusting a garbage collection schedule in dependence upon data placement and providing garbage collection statistics to the storage array controllers (106, 112) as will also be described in greater detail below.

The storage array controllers (106, 112) of FIG. 1 may be useful in placing data within a storage device according to embodiments of the present disclosure. The storage array controllers (106, 112) may assist in placing data within a storage device by determining an expected longevity of data stored on the storage device, sending information describing an expected longevity of data stored on the storage device to the storage devices (146, 152), and performing other functions as will be described in greater detail below.

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Placing data within a storage device in accordance with embodiments of the present disclosure is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful in placing data within a storage device according to embodiments of the present disclosure.

Figure 2:
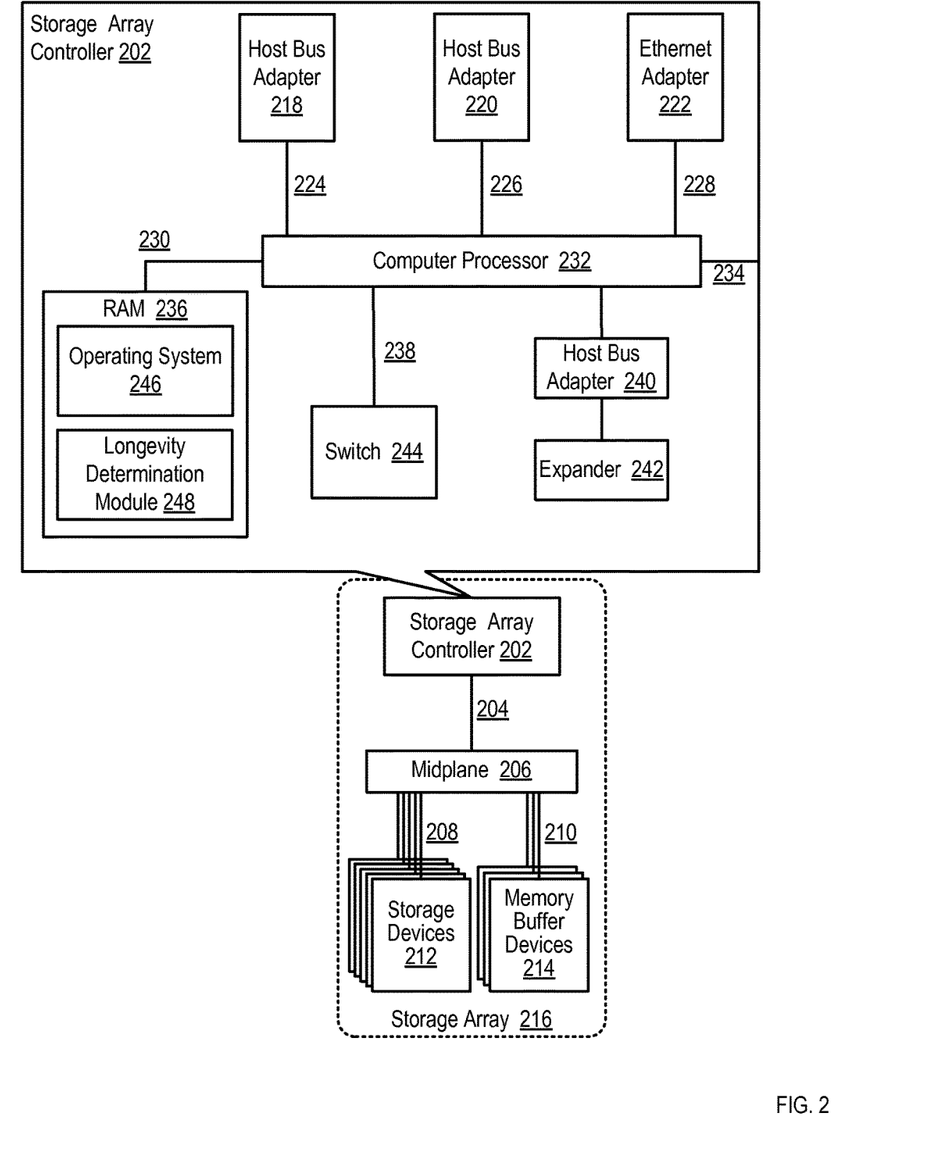
FIG. 2 sets forth a block diagram of an example storage array controller useful in placing data within a storage device according to embodiments of the present disclosure.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more memory buffer devices (214) that are included as part of a storage array (216). The storage array controller (202) may be coupled to the midplane (206) via one or more data communications links (204) and the midplane (206) may be coupled to the storage devices (212) and the memory buffer devices (214) via one or more data communications links (208, 210). The data communications links (204, 208, 210) of FIG. 2 may be embodied, for example, as Peripheral Component Interconnect Express ('PCIe') bus.

The storage array controller (202) of FIG. 2 includes at least one computer processor (232) or 'CPU' as well as random access memory ('RAM') (236). The computer processor (232) may be connected to the RAM (236) via a data communications link (230), which may be embodied as a high speed memory bus such as a Double-Data Rate 4 ('DDR4') bus.

Stored in RAM (214) is an operating system (246). Examples of operating systems useful in storage array controllers (202) configured for assisting in placing data within a storage device according to embodiments of the present disclosure include UNIX™, Linux™, Microsoft Windows™, and others as will occur to those of skill in the art. Also stored in RAM (236) is a longevity determination module (248), a module that includes computer program instructions useful in placing data within a storage device according to embodiments of the present disclosure. The longevity determination module (248) may be configured to determine an expected longevity of data already stored on the storage device, determine an expected longevity of data that is to be stored on the storage device, send such longevity information to the storage devices (146, 152), and perform other functions as will be described in greater detail below. Readers will appreciate that while the longevity determination module (248) and the operating system (246) in the example of FIG. 2 are shown in RAM (168), many components of such software may also be stored in non-volatile memory such as, for example, on a disk drive, on a solid-state drive, and so on.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each of the host bus adapters (218, 220, 222) may be coupled to the computer processor (232) via a data communications link (224, 226, 228) such as, for example, a PCIe bus.

The storage array controller (202) of FIG. 2 also includes a host bus adapter (240) that is coupled to an expander (242). The expander (242) depicted in FIG. 2 may be embodied as a module of computer hardware utilized to attach a host system to a larger number of storage devices than would be possible without the expander (242). The expander (242)

depicted in FIG. 2 may be embodied, for example, as a SAS expander utilized to enable the host bus adapter (240) to attach to storage devices in an embodiment where the host bus adapter (240) is embodied as a SAS controller.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a data communications link (234) for coupling the storage array controller (202) to other storage array controllers. Such a data communications link (234) may be embodied, for example, as a QuickPath Interconnect ('QPI') interconnect, as PCIe non-transparent bridge ('NTB') interconnect, and so on.

Readers will recognize that these components, protocols, adapters, and architectures are for illustration only, not limitation. Such a storage array controller may be implemented in a variety of different ways, each of which is well within the scope of the present disclosure.

Figure 3:
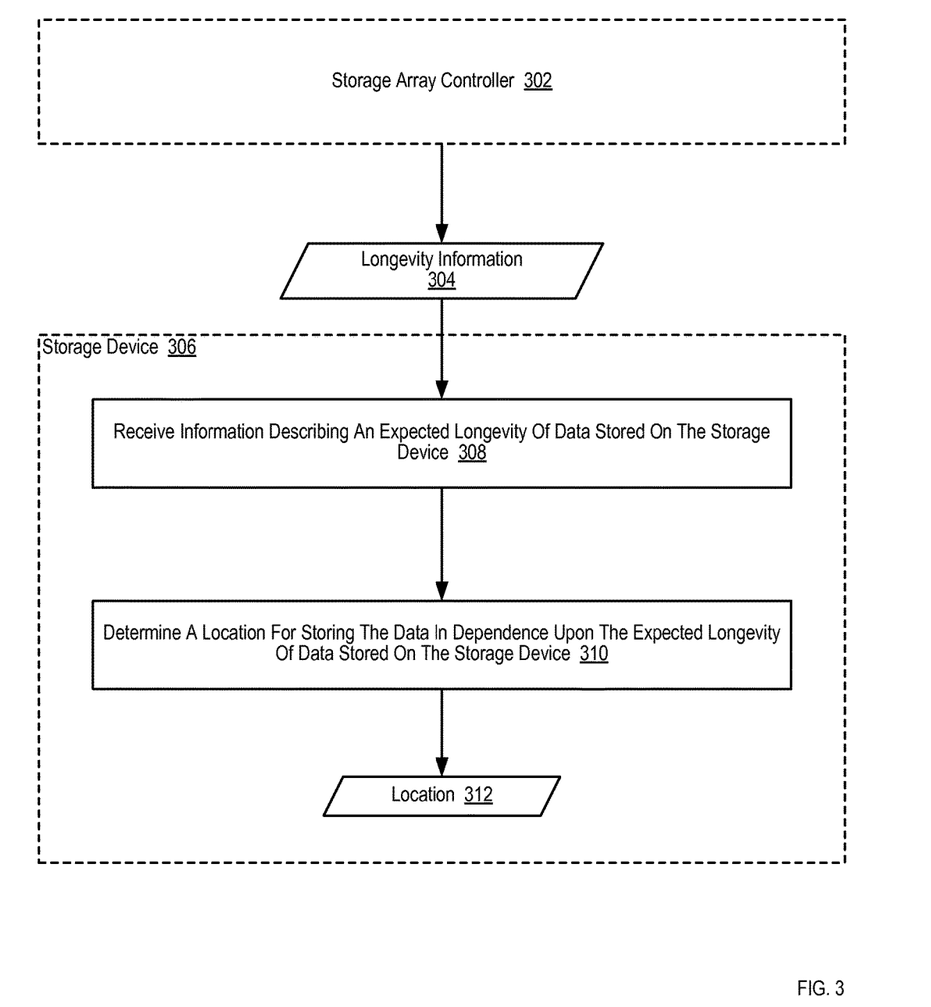
FIG. 3 sets forth a flow chart illustrating an example method for placing data within a storage device according to embodiments of the present disclosure.

For further explanation, FIG. 3 sets forth a flow chart illustrating an example method for placing data within a storage device (306) according to embodiments of the present disclosure. The storage device (306) depicted in FIG. 3 represents a computing device for storing data. The storage device (306) may be embodied, for example, as an HDD that is included in an array of storage devices, as an SSD that is included in an array of storage devices, or as any other computer storage device that may or may not be included in a larger storage system. The storage device (306) depicted in FIG. 3 may include one or more controllers or other forms of computer logic that are configured to carry out the steps described below and configured to ultimately facilitate the storage of data in the storage device (306).

The example depicted in FIG. 3 includes receiving (308), by the storage device (306), information (304) describing an expected longevity of data stored on the storage device (306). The expected longevity of data stored on the storage device (306) represents the amount of time that a particular data element stored on the storage device (306) is expected to remain valid. The expected longevity may be expressed in absolute terms such as seconds, minutes, hours, days, and so on. The expected longevity may alternatively be expressed in relative terms such as short term, medium term, long term, and so on.

In the example method depicted in FIG. 3, many events can cause the particular data element stored on the storage device (306) to become invalid. Events that can cause the particular data element to become invalid can include, for example, a user requesting that the data element be deleted from the storage device (306), a user requesting that the data element be overwritten, and so on. The expected longevity of a particular data element may therefore represent the amount of time until an event occurs that causes the particular data element to become invalid.

Consider an example in which the storage device (306) is embodied as an SSD. In such an example, assume that data stored in a particular memory block may only be erased and not modified in-place. As such, a user request that a particular data element be overwritten with a new version of the data element will result in the new version of the data element being written to a free area of memory and the old version of the data element being invalidated for subsequent garbage collection. In such an example, the user request that a particular data element be overwritten serves as an event that causes the particular data element to become invalid.

The example depicted in FIG. 3 also includes determining (310), by the storage device (306), a location (312) for storing the data in dependence upon the expected longevity of the data. The location (312) for storing the data may be embodied, for example, as a logical or physical address within the storage device (306), as a particular unit (e.g., a particular block, a particular sector) within the storage device (306), and so on. The location (312) for storing the data may be determined (310) in dependence upon the expected longevity of the data, for example, by the storage device (306) identifying locations within the storage device (306) where other data elements with similar expected longevities are stored. For example, if the expected longevity of a particular data element is 1 hour, the particular data element may be stored in a particular memory block where other data elements with expected longevities between 55 minutes and 65 minutes are stored. Likewise, if the expected longevity of a particular data element is 1 year, the particular data element may be stored in a particular memory block where other data elements with expected longevities between 360 days and 370 days are stored. In such a way, data elements with similar expected longevities may be stored in close proximity of each other within the storage device (306).

Readers will appreciate that by storing data elements with similar expected longevities in close proximity of each other within the storage device (306), the operation of the storage device can be improved. For example, areas of the storage device (306) that include data elements with relatively long expected longevities may be garbage collected less frequently than areas of the storage device (306) that include data elements with relatively short longevities, given that the data elements with relatively short longevities would be invalidated more frequently than the data elements with relatively long longevities.

Figure 4:
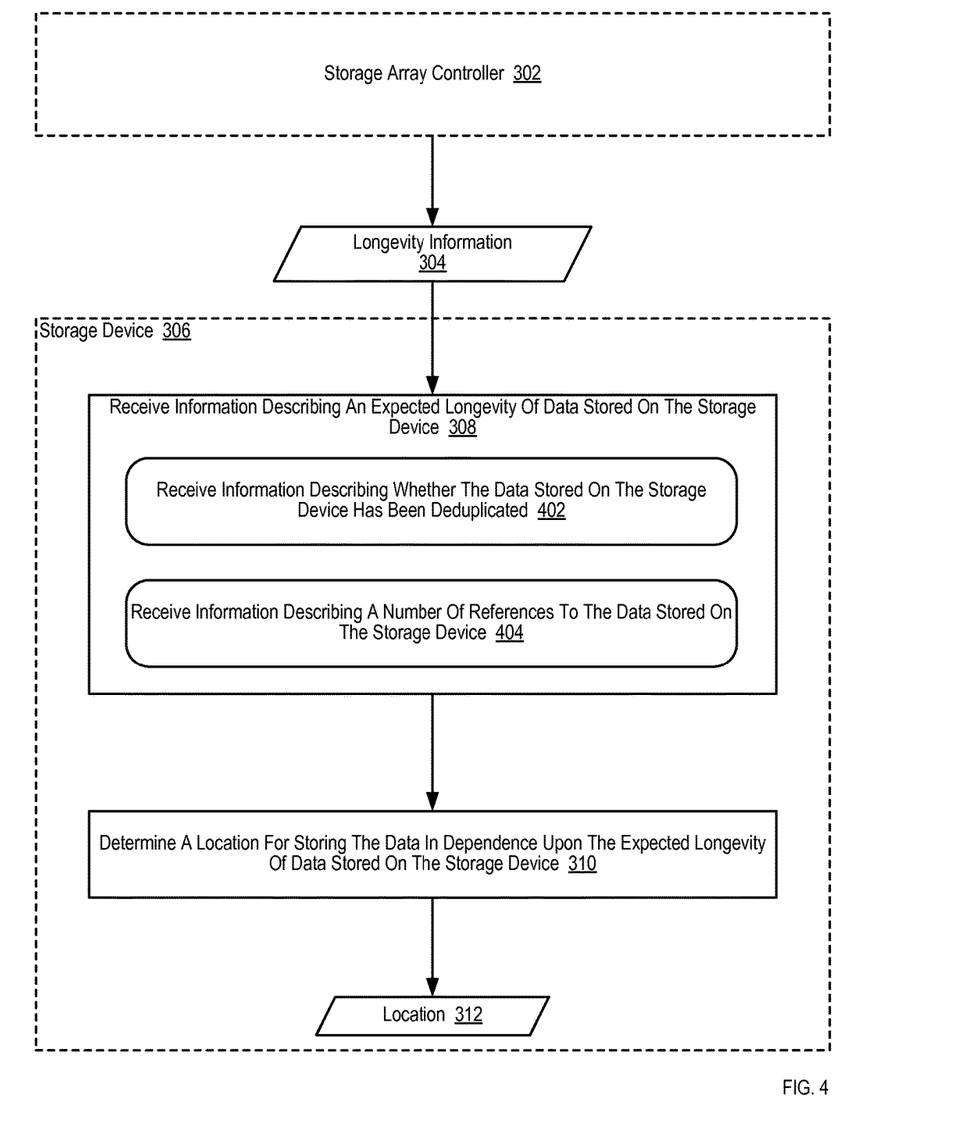
FIG. 4 sets forth a flow chart illustrating an additional example method for placing data within a storage device according to embodiments of the present disclosure.

For further explanation, FIG. 4 sets forth a flow chart illustrating an additional example method for placing data within a storage device (306) according to embodiments of the present disclosure. The example method depicted in FIG. 4 is similar to the example method depicted in FIG. 3, as the example method depicted in FIG. 4 also includes the storage device (306) receiving (308) information (304) describing an expected longevity of data stored on the storage device (306) and the storage device (306) also determining (310) a location (312) for storing the data in dependence upon the expected longevity of the data.

In the example method depicted in FIG. 4, receiving (308) information (304) describing an expected longevity of data stored on the storage device (306) and the storage device (306) can include receiving (402) information describing whether the data stored on the storage device (306) has been deduplicated. Data may be deduplicated in a storage system to avoid retaining multiple copies of identical data, such that storage isn't utilized to store multiple copies of identical data. Rather than storing multiple copies of the identical data, a single copy is stored and any attempts to store an additional copy of the same data may ultimately result in storing a reference to the already stored single copy.

Consider an example in which a particular file is stored on the storage device (306) at the request of a user of a storage system. In such an example, assume that the same user or another user of the storage system issues a request to store the same file on the same storage device (306) or on another storage device in a larger storage system. In such an example, rather than storing two copies of the same file, the request may be serviced by storing a reference that points to the already stored file.

In the example method depicted in FIG. 4, the information describing whether the data stored on the storage device (306) has been deduplicated may be received (402) by the storage device (306) from a storage array controller (302), which may be similar to the storage array controllers described above with reference to FIG. 1 and FIG. 2. The information describing whether the data stored on the storage device (306) has been deduplicated may be received (402) by the storage device (306), for example, via a message sent from the storage array controller (302) that includes longevity information (304). Such longevity information (304) may include, for example, a Boolean value indicating whether the data has or has not been deduplicated, information describing the number of references that point to the single copy of the data that is stored in the storage system, and so on.

Readers will appreciate that the information describing whether the data stored on the storage device (306) has been deduplicated relates to an expected longevity of the data, as data that is referenced many times is less likely to be deleted or otherwise invalidated than data that is referenced fewer times. Consider an example, in which a particular file is stored once by a first user and referenced an additional 100 times in response to 100 additional users attempting to store the same file. In such an example, even if one user deletes the file, the file will remain valid as another 100 users have not deleted the file. In contrast, if a file is stored once by a first user and never referenced again, if the first user subsequently deletes the file, the file will become invalid. As such, an indication that data stored on the storage device (306) has been deduplicated may be interpreted as indicating that the data has a longer expected longevity than data that has not been deduplicated.

In the example method depicted in FIG. 4, receiving (308) information describing an expected longevity of data stored on the storage device (306) and the storage device (306) can alternatively include receiving (404) information describing a number of references to the data stored on the storage device (306). As described above, in order to avoid retaining multiple copies of identical data, a request to store data that matches other data already stored in the storage device (306) may be serviced by storing a reference to the other data already stored in the storage device (306). In fact, multiple requests to store data that matches other data already stored in the storage device (306) may be serviced by storing multiple references to the other data already stored in the storage device (306).

In the example method depicted in FIG. 4, the information describing a number of references to the data stored on the storage device (306) may be received (404) by the storage device (306) from a storage array controller (302), which may be similar to the storage array controllers described above with reference to FIG. 1 and FIG. 2. The information describing a number of references to the data stored on the storage device (306) may be received (404) by the storage device (306), for example, via a message sent from the storage array controller (302) that includes longevity information (304). Such longevity information (304) may include, for example, a Boolean value indicating whether the data has or has not been deduplicated, information describing the exact number of references that point to the single copy of the data that is stored in the storage system, information describing an approximated number of references that point to the single copy of the data that is stored in the storage system, information describing the relative number (e.g., many, few) of references that point to the single copy of the data that is stored in the storage system, and so on.

Readers will appreciate that the information describing a number of references to the data stored on the storage device (306) relates to an expected longevity of the data, as data that is referenced many times is less likely to be deleted or otherwise invalidated than data that is referenced fewer times. Consider an example, in which a particular file is stored once by a first user and referenced an additional 100 times in response to 100 additional users attempting to store the same file. In such an example, even if one user deletes the file, the file will remain valid as another 100 users have not deleted the file. In contrast, if a file is stored once by a first user and never referenced again, if the first user subsequently deletes the file, the file will become invalid. As such, as the number of references to the data stored on the storage device (306) increases, the expected longevity of the data may also increase.

Figure 5:
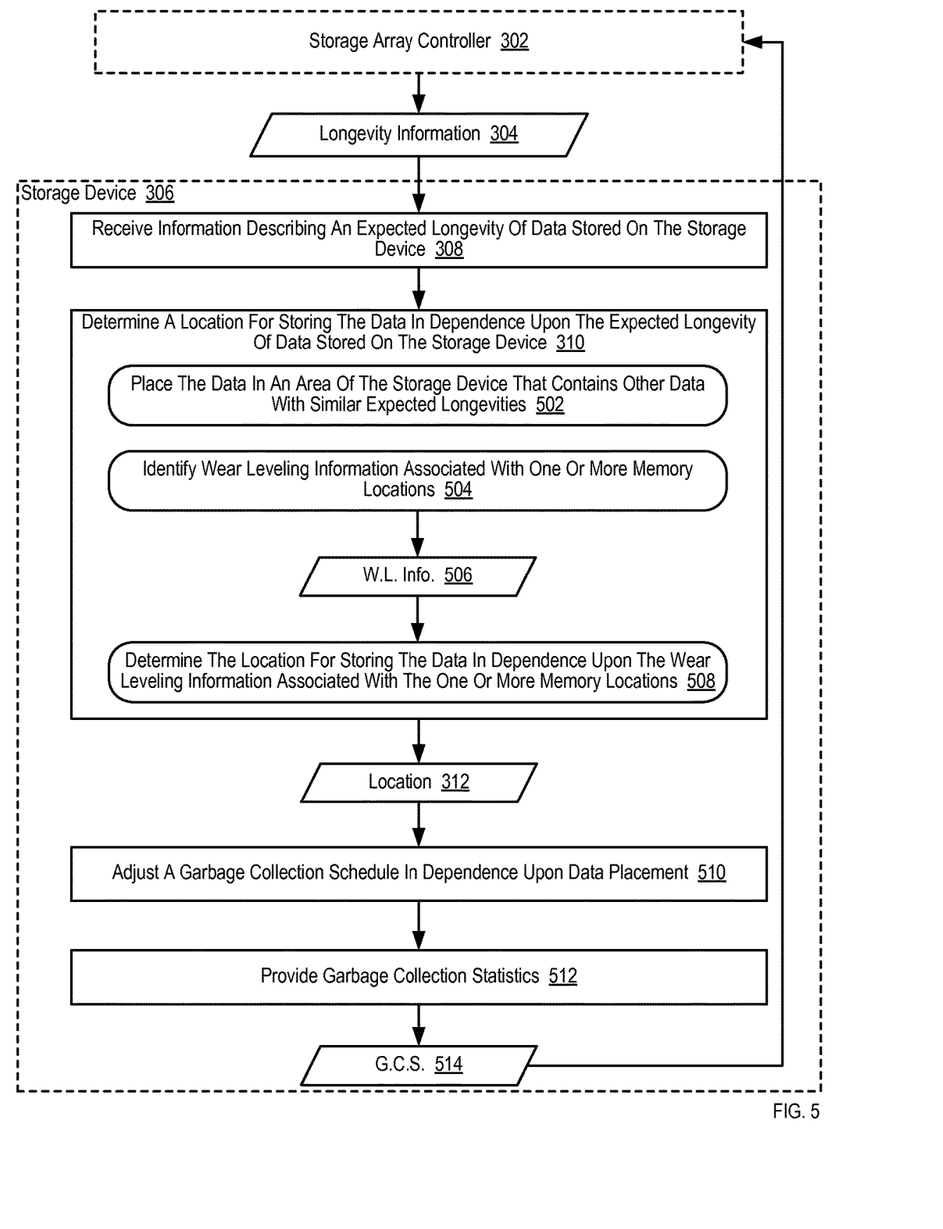
FIG. 5 sets forth a flow chart illustrating an additional example method for placing data within a storage device according to embodiments of the present disclosure.

For further explanation, FIG. 5 sets forth a flow chart illustrating an additional example method for placing data within a storage device (306) according to embodiments of the present disclosure. The example method depicted in FIG. 5 is similar to the example method depicted in FIG. 3, as the example method depicted in FIG. 5 also includes the storage device (306) receiving (308) information (304) describing an expected longevity of data stored on the storage device (306) and the storage device (306) also determining (310) a location (312) for storing the data in dependence upon the expected longevity of the data.

In the example method depicted in FIG. 5, determining (310) a location (312) for storing the data in dependence upon the expected longevity of the data can include placing (502) the data in an area of the storage device (306) that contains other data with similar expected longevities. Other data may be deemed as having 'similar' expected longevities, for example, when the other data falls within a longevity range that also captures the expected longevity of the data, when the expected longevity of the other data is within a predetermined amount of time of the expected longevity of the data, when the expected longevity of the other data is within a predetermined percentage of the expected longevity of the data, and so on.

In the example method depicted in FIG. 5, an area of the storage device (306) may be defined by a predetermined range of addresses, by a predetermined group of units wither the storage device (306) such as a predetermined group of pages, a predetermined group of memory blocks, and so on. Readers will further appreciate that areas of the storage device (306) may be defined to take into account the operation of the storage device (306). For example, if the storage device (306) is an SSD that erases an entire block of memory when performing an erase operation, each erasable unit (i.e., each block) may be designated as a distinct area of the storage device (306).

Placing (502) the data in an area of the storage device (306) that contains other data with similar expected longevities may be carried out, for example, by associating a predetermined range of longevity values with one or more areas of the storage device (306). For example, a first group of memory blocks may be associated with longevity values between 1 hour and 2 hours, a second group of memory blocks may be associated with longevity values between 2 hours and 4 hours, and so on. In such an example, placing (502) the data in an area of the storage device (306) that contains other data with similar expected longevities can be carried out by placing the data in the area of the storage device (306) whose associated range of longevity values encompass the expected longevity of the data. Continuing with the example described above, if the expected longevity of data is 90 minutes the data may be placed within the first group of memory blocks, while if the expected longevity of data is 270 minutes the data may be placed within the second group of memory blocks.

Although the example described above includes expected longevities and ranges that are expressed in units of time, readers will appreciate that other embodiments are well within the scope of the present disclosure. For example, the expected longevities and the ranges associated with one or more areas of the storage device (306) may be expressed in relative terms (e.g., short, long, on a relative scale) or in other units of measure. Furthermore, the association between one or more areas of the storage device (306) and an associated range of longevities may change over time for any number of reasons.

In the example method depicted in FIG. 5, determining (310) a location (312) for storing the data in dependence upon the expected longevity of the data can alternative include identifying (504) wear leveling information (506) associated with one or more memory locations and determining (508) the location for storing the data in dependence upon the wear leveling information (506) associated with the one or more memory locations. Wear leveling information (506) can include information such as, for example, the number of program-erase cycles that have been performed on one or more memory locations. Such information (506) may be monitored and utilized to facilitate relatively even use of all areas of the storage device (306).

In the example method depicted in FIG. 5, identifying (504) wear leveling information (506) associated with one or more memory locations may be carried out in a variety of ways. For example, identifying (504) wear leveling information (506) associated with one or more memory locations may be carried out by the storage device (306) itself maintaining an exact or approximate count of the number of times a particular block of memory has been programmed and erased. Alternatively, identifying (504) wear leveling information (506) associated with one or more memory locations by the storage array controller (302) maintaining an exact or approximate count of the number of times a particular block of memory has been programmed and erased, and the storage array controller (302) subsequently sending such information (506) to the storage device (306).

In the example method depicted in FIG. 5, determining (508) the location for storing the data in dependence upon the wear leveling information (506) associated with the one or more memory locations may be carried out, for example, by selecting memory locations with relatively low levels of usage to store data with relatively short expected longevities. Readers will appreciate that because data with a relatively short expected longevity will be invalidated and removed from the storage device (306) more frequently than data with a relatively long expected longevity, placing data with a relatively short expected longevity at a location in the storage device (306) with relatively low levels of usage will cause the location to experience a higher frequency of usage, thereby advancing wear leveling goals.

As a corollary to the idea expressed above, determining (508) the location for storing the data in dependence upon the wear leveling information (506) associated with the one or more memory locations may also be carried out by selecting memory locations with relatively high levels of usage to store data with relatively long expected longevities. Readers will appreciate that because data with a relatively long expected longevity will be invalidated and removed from the storage device (306) less frequently than data with a relatively short expected longevity, placing data with a relatively long expected longevity at a location in the storage device (306) with relatively high levels of usage will cause the location to experience a lower frequency of usage, thereby advancing wear leveling goals. Readers will appreciate that over time, the designation of a particular location within the storage device (306) as being over-utilized or under-utilized may change in response to determining (508) the location for storing the data in dependence upon the wear leveling information (506) associated with the one or more memory locations.

The example method depicted in FIG. 5 also includes adjusting (510) a garbage collection schedule in dependence upon data placement. In the example method depicted in FIG. 5, adjusting (510) a garbage collection schedule in dependence upon data placement may be carried out by increasing the frequency at which garbage is collected on areas that contain data with relatively short expected longevities, decreasing the frequency at which garbage is collected on areas that contain data with relatively long expected longevities, and so on. Readers will appreciate that because data with relatively short expected longevities is expected to become invalid more frequently than data with relatively long expected longevities, the areas of memory that contain data with relatively short expected longevities can benefit from more frequent garbage collection than data with relatively long expected longevities.

Consider an example in which a first area of memory contains data with an expected longevity of 15 seconds and a second area contains data with an expected longevity of 15 days. In such an example, assume that each area of memory was garbage collected every 15 seconds. While such a schedule might be useful in preventing invalid data from remaining in the first area for too long, such a schedule would generally result in wasted processing resources (e.g., processor cycles) when garbage collecting the second area, as data with an expected longevity of 15 days would rarely become invalid within a given 15 second window. As an alternative, assume that each area of memory was garbage collected every 15 days. While such a schedule might be useful in conserving processing resources by not over-performing garbage collection operations on the second area, such a schedule would result in the first area almost exclusively storing invalid data. Readers will appreciate that any collection schedule that causes garbage to be collected at some frequency between every 15 seconds and every 15 days would result in some combination of the defects described above. By adjusting (510) a garbage collection schedule in dependence upon data placement, however, areas that would benefit from relatively frequent garbage collection could be garbage collected more frequently than areas that would not benefit from relatively frequent garbage collection.

The example method depicted in FIG. 5 also includes providing (512), to a storage array controller, garbage collection statistics (514). Such garbage collection statistics (514) may indicate, for example, a percentage of data elements within a particular area that were invalid at the time garbage collection operations were performed on the particular area. The garbage collection statistics (514) may be utilized to further tune a garbage collection schedule, to provide feedback on how effectively the expected longevity of various data objects are being projected, and so on.

Consider an example in which the garbage collection statistics (514) indicate that 100% of the data elements within a particular area were invalid at the time garbage collection operations were performed on the particular area. In such an example, the garbage collection schedule may be tuned to perform garbage collection operations on the particular area more frequently as the particular area was being used exclusively to store data that does not need to be retained.

Alternatively, consider an example in which the garbage collection statistics (514) indicated that 1% of the data elements with an expected longevity of 1 hour to 2 hours were invalid at the time that garbage collection operations were performed, in spite of the fact that garbage collection operations were only performed on such data elements every 2 hours. In such an example, the garbage collection statistics (514) may indicate that the actual longevity of such data elements was longer than 2 hours, and the methodology for projecting the expected longevity of such data elements may be adjusted to attempt to more accurately project the expected longevities of such data elements.

Example embodiments of the present disclosure are described largely in the context of a fully functional computer system. Readers of skill in the art will recognize, however, that the present disclosure also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware, as hardware, or as an aggregation of hardware and software are well within the scope of embodiments of the present disclosure.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of placing data within a storage device of a flash array, the method comprising:
   receiving, by a storage device of a plurality of storage devices in the flash array, information describing an expected longevity of data stored on the storage device, wherein the expected longevity is based on a number of references to data stored on the storage device;
   determining, by the storage device, a location for storing the data in dependence upon the expected longevity of the data including: identifying wear leveling information associated with one or more memory locations in the storage device; and
   determining the location for storing the data in dependence upon the wear leveling information associated with the one or more memory locations, wherein locations with relatively low levels of wear are selected to store data with relatively short expected longevities, and further wherein locations with relative high levels of wear are selected to store data with relatively long expected longevities;
   determining a garbage collection schedule for the location based on the number of stored references to the data, wherein determining the garbage collection schedule comprises increasing garbage collection frequency on areas with a low number of references; and
   providing, to a storage array controller, garbage collection statistics.

2. A storage device, the storage device configured to carry out the steps of:
   receiving, by a storage device included in a plurality of storage devices of a flash array, information describing an expected longevity of data stored on the storage device, wherein the expected longevity is based on a number of references to data stored on the storage device;
   determining, by the storage device, a location for storing the data in dependence upon the expected longevity of the number of references to the data including: identifying wear leveling information associated with one or more memory locations in the storage device;
   determining, by the storage device, a location for storing the data in dependence upon the expected longevity of the data including: identifying wear leveling information associated with one or more memory locations in the storage device; and
   determining the location for storing the data in dependence upon the wear leveling information associated with the one or more memory locations, wherein locations with relatively low levels of wear are selected to store data with relatively short expected longevities, and further wherein locations with relative high levels of wear are selected to store data with relatively long expected longevities;
   determining a garbage collection schedule for the location based on the number of stored references to the data, wherein determining the garbage collection schedule comprises increasing garbage collection frequency on areas with a low number of references; and
   providing, to a storage array controller, garbage collection statistics.

3. A computer program product for placing data within a storage device of a flash array, the computer program product including a non-transitory computer readable medium that includes computer program instructions that, when executed, cause a storage device to carry out the steps of:
   receiving, by a storage device of a plurality of storage devices of the flash array, information describing an expected longevity of a number of references to data stored on the storage device, wherein the expected longevity is based on a number of references to data stored on the storage device;
   determining, by the storage device, a location for storing the data in dependence upon the expected longevity of the data including: identifying wear leveling information associated with one or more memory locations in the storage device; and
   determining the location for storing the data in dependence upon the wear leveling information associated with the one or more memory locations, wherein locations with relatively low levels of wear are selected to store data with relatively short expected longevities, and further wherein locations with relative high levels of wear are selected to store data with relatively long expected longevities;

determining a garbage collection schedule for the location based on the number of stored references to the data, wherein determining the garbage collection schedule comprises increasing garbage collection frequency on areas with a low number of references; and providing, to a storage array controller, garbage collection statistics.

* * * * *